United States Patent Office
2,905,648
Patented Sept. 22, 1959

2,905,648

COMPOSITION COMPRISING A VINYLIDENE CHLORIDE POLYMER AND MIXTURES OF ALKALI METAL SALTS OF OXY ACIDS

Emil M. Haas, Midland, Mich., assignor to The Dow Chemical Company, Midland, Mich., a corporation of Delaware No Drawing. Application October 24, 1955
Serial No. 542,490

1 Claim. (Cl. 260—2.5)

This invention relates to a composition of matter and to a process for preparing oriented thermoplastic filaments having a unique appearance. More particularly, it relates to a process for preparing oriented filaments which has a satiny appearance from normally crystalline vinylidene chloride polymers, and to the filaments so produced.

Filaments prepared from normally crystalline vinylidene chloride polymers have found widespread use in making upholstery fabrics for automobile seat covers and weather-resistant furniture. Such filaments are easily prepared by extrusion methods and are readily colored with a wide variety of pigments. However, as normally produced, they have light reflective smooth surfaces and are available only in a form having a high gloss. For many applications it would be desirable to have filaments having a metallic luster which would give a satiny appearance to an article woven from such filaments. In the past it has been attempted unsuccessfully to prepare filaments having such an appearance by using light absorptive or dispersive pigments and other additives.

It is accordingly an object of this invention to provide a new composition of matter and a process for preparing filaments having a satiny appearance from such compositions containing normally crystalline vinylidene chloride polymers.

It is a further object to prepare such filaments having substantially the same strength and flexibility as similar glossy filaments.

The above and related objects are accomplished by forming an intimate powder mixture of a normally crystalline vinylidene chloride polymer and minor amounts of an inorganic salt of a halogen oxy acid and of certain inorganic salts of oxy acids of phosphorus, heating and expressing the molten mixture through a die to form a continuous filamentary article and finally stretching the so-formed filamentary article to orient it. Filaments prepared in accordance with this invention have a unique satiny appearance or luster and are opaque but retain the desirable strength and flexibility of otherwise identical fibers prepared by conventional methods.

Normally crystalline vinylidene chloride polymers are well-known in the art. As such they are usually defined as copolymers of vinylidene chloride with another co-polymerizable monomer such as vinyl chloride, vinyl acetate, and acrylonitrile and in which the vinylidene chloride is present in predominant proportion. Such copolymers exhibit crystallinity when examined by X-ray diffraction methods.

The first inorganic salt may be any alkali metal, preferably sodium or potassium, salt of any halogen oxy acid. Sodium chlorate and sodium bromate are the most efficient salts and are preferred in the compositions. Iodine containing salts produce the satiny appearance but cause an objectionable discoloration.

The second inorganic salt which may be used is any alkali metal, preferably sodium or potassium, salt of the oxy acids of phosphorus. As typical examples of such salts may be mentioned monosodium phosphate, disodium phosphate, tetrasodium pyrophosphate, pentasodium triphosphate, sodium phosphite, and disodium phosphite.

The amounts of the ingredients may be varied within wide limits, the halogen containing compound being used in the range of from 0.05 to 0.3 percent by weight based on the weight of the polymer and the phosphorus compound in the range of from 0.05 to 0.3 percent by weight based on the weight of the polymer. When lesser amounts are employed no luster is apparent in extruded and stretched filaments and when greater amounts are used no increase in luster is produced and the properties of the filaments are adversely affected. When the halogen-containing compound and the phosphorus compound are employed in the above-stated amounts very tiny bubbles or voids are produced in the filaments during extrusion, which are subsequently elongated during streching. Although there is no critical size for the voids they are barely visible to the naked eye when a cross section of a filament is examined.

Other ingredients such as pigments may be added to the mixture without affecting the process. By a careful selection of such materials a trained formulator can achieve some very striking effects in the appearance of the filaments.

Although the various ingredients may be mixed in any known manner it has been found most convenient to add the halogen and phosphorus compounds to the polymer as wet slurries or solutions and to dry the resulting blend. By such a method more uniform distribution of the ingredients is achieved than when all ingredients are mixed dry.

The process of the invention will be more apparent from the following illustrative example in which all parts are by weight.

*Example*

A sample was prepared from 400 parts of a copolymer prepared from a monomeric material consisting of 85 percent vinylidene chloride and 15 percent vinyl chloride, 8 parts of 2-hydroxy 5-chlorobenzophenone, a known light stabilizer for that polymer, and 28 parts of alpha, alpha'-diphenyl diethyl ether. One part of disodium phosphate was dissolved in water and added to the mixture. To the mixture was then added 0.5 part of sodium bromate dissolved in water. The mixture was vacuum dried at 70° C. and extruded as 0.01 inch monofilaments. Immediately following extrusion the filaments were supercooled and then stretched to about 4 times their extruded length. The resulting filaments had a satiny appearance, a density of 1.2, and a tensile strength of 35,000 pounds per square inch.

Filaments having the same appearance and similar properties were obtained when the disodium phosphate was replaced by monosodium phosphate, sodium tripolyphosphate, tetrasodium pyrophosphate, sodium phosphite, and disodium phosphite and also when the sodium bromate was replaced with sodium chlorate.

By way of contrast, when neither a phosphorus nor a halogen oxy acid salt was incorporated into the mixture the resulting filaments were translucent, had a high reflectance, had densities of 1.6 and tensile strengths of 40,000 pounds per square inch.

I claim:

A composition of matter consisting essentially of a normally crystalline vinylidene chloride polymer and from 0.05 to 0.3 percent by weight of an alkali metal salt of a halogen oxy acid wherein said halogen is selected from the class consisting of chlorine and bromine and from 0.05 to 0.3 percent by weight of an alkali metal salt of a phosphorus oxy acid the weight of each of said salts being based on the weight of said polymer.

References Cited in the file of this patent

UNITED STATES PATENTS

| | | |
|---|---|---|
| Re. 20,953 | Stoeckly | Dec. 20, 1938 |
| 2,065,766 | Taylor | Dec. 29, 1936 |
| 2,251,486 | Hanson | Aug. 5, 1941 |
| 2,542,973 | Abernethy | Feb. 27, 1951 |
| 2,543,027 | Jones | Feb. 27, 1951 |
| 2,806,823 | Sullivan | Sept. 17, 1957 |
| 2,808,379 | Walter | Oct. 1, 1957 |